(12) United States Patent
Smith et al.

(10) Patent No.: US 7,817,259 B2
(45) Date of Patent: Oct. 19, 2010

(54) MEASUREMENT OF TEST OBJECT WITH STACKED FEATURES

(75) Inventors: Ronald Jacob Smith, Belle Plaine, MN (US); John George Gerogeorge, Chanhassen, MN (US); Sham Sunder Nayar, Savage, MN (US); Mark Curtis Fahrendorff, New Prague, MN (US); Shawn Stephen Silewski, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 848 days.

(21) Appl. No.: 11/731,368

(22) Filed: Mar. 29, 2007

(65) Prior Publication Data
US 2008/0062411 A1 Mar. 13, 2008

Related U.S. Application Data

(60) Provisional application No. 60/843,058, filed on Sep. 8, 2006.

(51) Int. Cl.
*G01C 1/00* (2006.01)
*G01B 11/14* (2006.01)
(52) U.S. Cl. ...................... 356/138; 356/614
(58) Field of Classification Search ............ None
See application file for complete search history.

(56) References Cited

U.S. PATENT DOCUMENTS

| | | | |
|---|---|---|---|
| 4,528,453 | A | 7/1985 | Heller |
| 5,832,764 | A | 11/1998 | Girard |
| 5,929,987 | A | 7/1999 | Hayes |
| 5,959,450 | A | 9/1999 | Moroe et al. |
| 6,466,257 | B1 * | 10/2002 | Baugh et al. ............ 382/218 |
| 7,021,097 | B1 | 4/2006 | Ubl et al. |
| 7,027,141 | B2 | 4/2006 | Girard et al. |
| 7,069,156 | B2 | 6/2006 | Zeng |
| 7,082,670 | B2 | 8/2006 | Boismier et al. |
| 7,304,751 | B2 * | 12/2007 | Tegethoff ................ 356/630 |
| 2002/0035777 | A1 * | 3/2002 | Hashimoto et al. ...... 29/603.09 |
| 2002/0069510 | A1 | 6/2002 | Girard et al. |
| 2002/0135926 | A1 | 9/2002 | Girard et al. |
| 2004/0208440 | A1 | 10/2004 | Tateiwa |
| 2004/0231139 | A1 | 11/2004 | Jurgenson |
| 2006/0002028 | A1 | 1/2006 | Nayar et al. |
| 2006/0072381 | A1 | 4/2006 | Girard |
| 2006/0109453 | A1 | 5/2006 | Swift et al. |
| 2008/0195352 | A1 * | 8/2008 | Cipriani .................. 356/601 |

* cited by examiner

*Primary Examiner*—Gregory J Toatley, Jr.
*Assistant Examiner*—Juan D Valentin
(74) *Attorney, Agent, or Firm*—Fellers, Snider, et al.

(57) ABSTRACT

An apparatus and associated method for measuring spatial characteristics of a test object with stacked features. First and second measurement assemblies for measuring opposing first and second planar features, respectively, of a test object, by directing light beams into a gap between the features to measure a position and a static attitude of each feature.

33 Claims, 9 Drawing Sheets

MEASUREMENT OF TEST OBJECT WITH STACKED FEATURES

RELATED APPLICATIONS

This application makes a claim of domestic priority under 35 U.S.C. §119(e) to Provisional Patent Application No. 60/843,058.

BACKGROUND

Approaches used in performing precise measurements of components and component assemblies in electronics equipment have had to adapt to rapidly changing events affecting factory processes. For example, the sheer size of the components and assemblies has rendered some past measurement approaches obsolete, as miniaturization has fully taken hold of the electronics market. Also, although the electronics package is continually shrinking, the converse is generally true for the electronics feature set that is offered. That is, a predominant demand driving the electronics market in the recent past and for the foreseeable future is for more complex and more capable devices in ever-smaller sizes.

To keep pace with these changing events, manufacturers have replaced static measuring tools and fixtures with highly complex processor controlled measurement systems. Successful efforts have also been employed to reengineer the factory to build quality into the process rather than inspect quality into the finished goods.

These and other recent improvements in the art have significantly improved not only the ability to perform precise measurements, but have also made gains in the often competing goals of enhanced quality and faster throughput. It is to the furthering of those efforts that the embodiments of the present invention are directed.

SUMMARY OF THE INVENTION

Embodiments of the present invention are generally directed to a method and apparatus for supporting a test object having a pair of opposing test surfaces that are longitudinally aligned by cantilever portions of the test object to spatially separate the test surfaces forming a gap therebetween; zeroing to a reference datum along an axial direction coextensive with a plane that includes a longitudinal axis of each test surface; and determining both an axial position in relation to the reference datum and a static attitude of each test surface by encroaching the gap with a measurement device without altering the longitudinal alignment of the test surfaces.

These and various other features and advantages which characterize the claimed embodiments will become apparent upon reading the following detailed description and upon reviewing the associated drawings.

DETAILED DESCRIPTION

Figure 1:
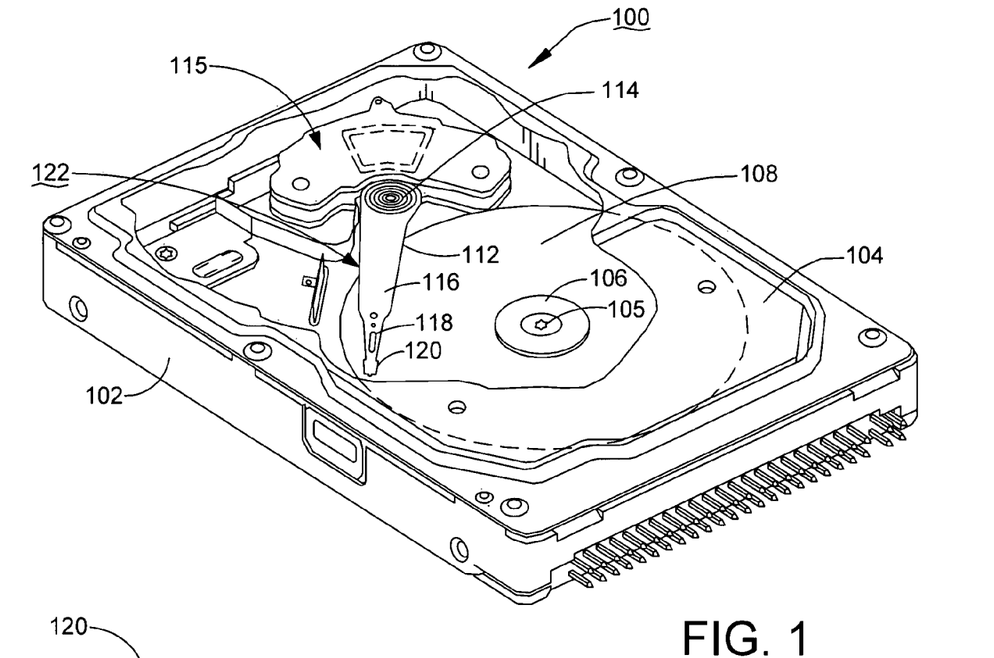
FIG. 1 is an isometric view of a data storage device suited for carrying out illustrative embodiments of the present invention.

Referring to the drawings in general, and more particularly to FIG. 1 that shows an isometric view of a data storage device 100 (or "drive") suited for carrying out illustrative embodiments of the present invention. Although the following description describes an apparatus and method used in precisely measuring components of the drive 100, the present embodiments as contemplated herein and as claimed are not so limited. The skilled artisan will readily understand the present embodiments are equivalently useable in performing precise measurements in components of other devices as well. As such, an enumeration of all useful applications of the present embodiments is not necessary for the skilled artisan to comprehend the claimed scope of the present embodiments.

The drive 100 has an actuator 112 with an arm 116 supporting a suspension 118 that, in turn, supports a head 120 (or "transducer") at a distal end thereof in a data transfer relationship with a data storage medium ("disc") 108. The actuator 112, a bearing 114 supported by the actuator 112, and the head 120 are typically attached to the drive 100 as a subassembly component referred to as a head stack assembly ("HSA") 122.

Figure 2:
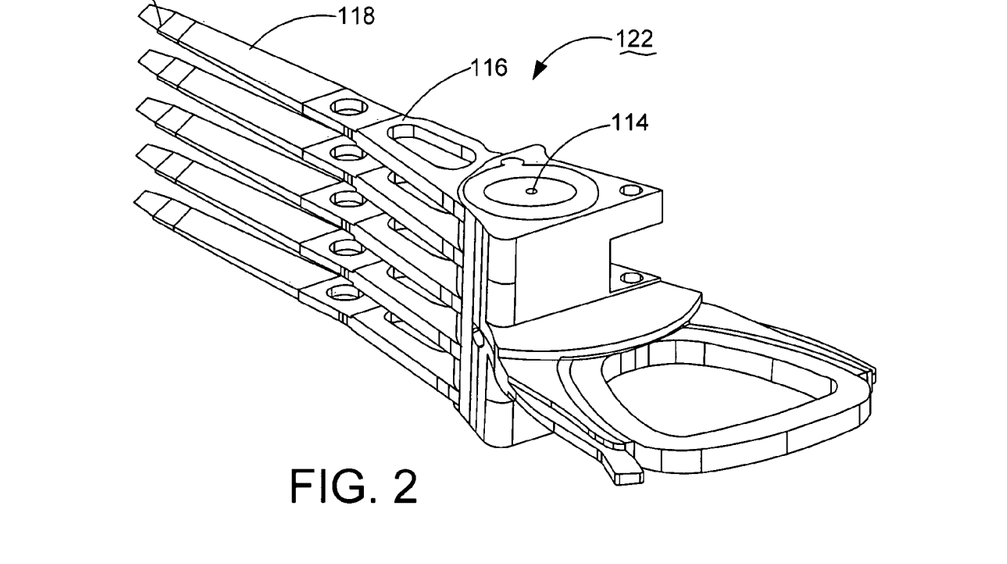
FIG. 2 is an isometric view of the head stack assembly in the device of FIG. 1.

FIG. 2 depicts an HSA 122 with multiple heads 120 used in a drive 100 having a stack of multiple discs 108, with one disc 108 operably disposed in each of the gaps between adjacent opposing heads 120 so that one head 120 is operably disposed adjacent each of the disc 108 surfaces.

Figure 3:
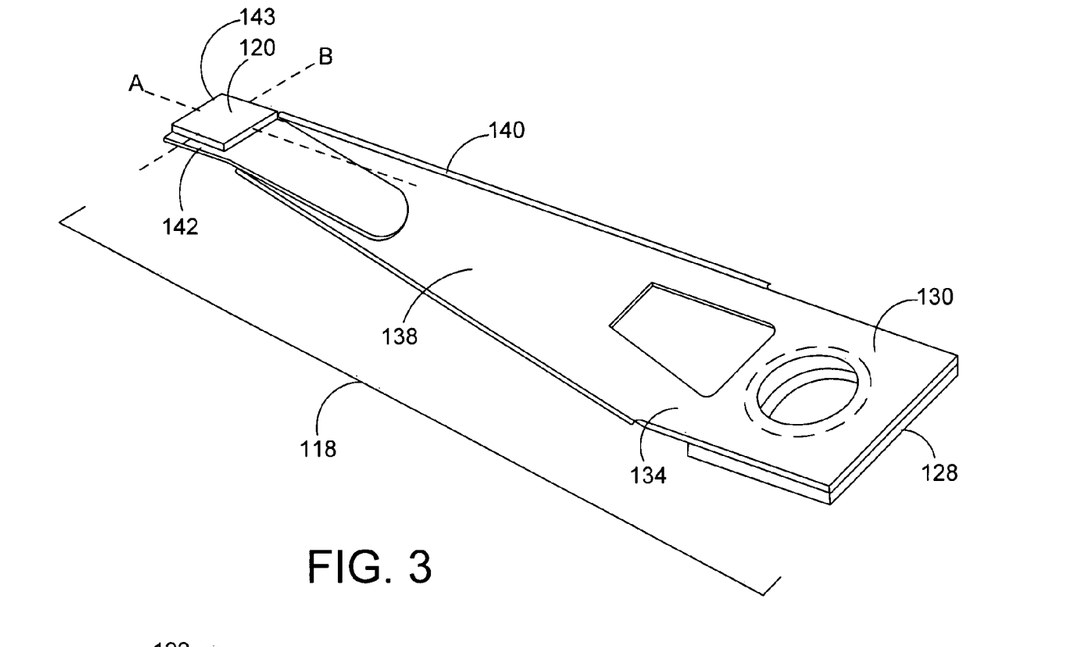
FIG. 3 is an isometric view of a suspension member of the head stack assembly of FIG. 2.

FIG. 3 is an isometric depiction of the suspension 118 that is attached at a proximal end 128 thereof to the arm 116 (FIG. 2). The suspension 118 has a spring section 134 that permits a predetermined flexure of the head 120 relative to a mounting section 130. The spring section 134 provides a preload bias of the head 120 toward the disc 108 when the disc 108 is not spinning, or in other words when the head 120 is in an unloaded state. The preload bias is countered by airflow pressure against the head 120 from the spinning disc 108 in the loaded state of the head 120. Balancing the preload bias and the airflow pressure results in a desired fly height of the head 120 adjacent the disc 108 in the loaded state. A gimbal 142 is depicted as being attached to a load beam 138 forming a distal end of the suspension 118. A slider 143 is attached to the gimbal 142 and supports, in turn, the head 120.

In order to provide the desired fly height characteristics, the slider 143 must be statically offset in relation to the mounting portion 130 within predetermined manufacturing tolerances. The unloaded position of the slider 143 is measured in terms of the pitch static attitude and roll static attitude. The pitch static attitude, or pitch aspect, is a measurement of the planar disposition of the slider 143 in relation to rotation around axis B. The roll static attitude, or roll aspect, is a measurement of the planar disposition of the slider 143 in relation to rotation around axis A.

It is imperative that the static offset of the slider 143 from the plane of the mounting portion 130, as well as the slider 143 pitch and roll static attitude, be verified during manufacturing. Verifying that the static offset and pitch/roll static attitude are within predetermined tolerances ensures that the head 120 will fly within a zone adjacent a selected data storage track in which it is capable of reliable data transfer operations with the storage medium 108.

The present embodiments contemplate advantageously performing this verification after all the suspensions 118 have been longitudinally aligned and assembled into the HSA 122 level subassembly component of FIG. 2. Measuring these spatial characteristics in this manner yields comparatively more valuable information than measuring individual suspensions 118 as in FIG. 3. This is due in part to measurements being taken of the components as they will exist in the finally assembled drive 100. If these measurements are verified at the suspension 118 component level, then factors such as tolerance stacks, handling damage, and downstream operations can adversely affect the spatial characteristics, and yet go unchecked. In one such downstream operation, for example, a shipping comb (not shown) can be inserted between adjacent heads 120 to support them in transit, and to elastically separate adjacent heads 120 to form clearance gaps for merging the HSA 122 with the disc 108 stack. It is possible for the shipping comb insertion process to go awry and plastically deform a suspension 118 so as to make the head 120 offset or pitch and roll static attitude out of tolerance.

Figure 4:
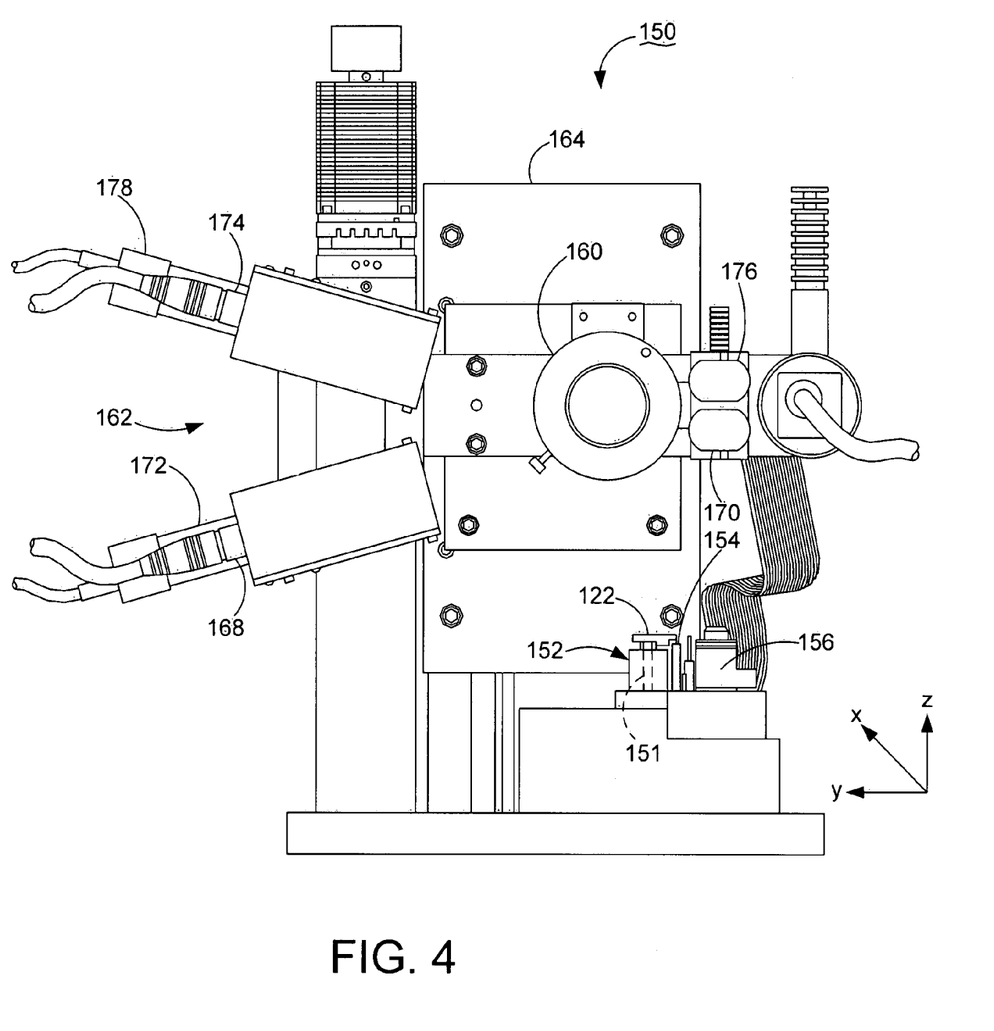
FIG. 4 is an elevational view of a measurement apparatus constructed in accordance with embodiments of the present invention.

FIG. 4 is an elevational depiction of a measurement apparatus 150 that is constructed in accordance with embodiments of the present invention. Generally, the apparatus 150 is configured for measuring spatial characteristics of a complex test object, such as the HSA 122 in illustrative embodiments. The apparatus 150 has a locating fixture 152 for securely positioning a test object, such as but not limited to the HSA 122, during testing. That is, for purposes of describing illustrative embodiments of the present invention, the test object refers to the HSA 122. However, the meaning of the term "test object" is not so limited in the contemplated embodiments and the appended claims, because objects other than the HSA 122 are readily adaptable for being securely positioned for measurement by the apparatus 150.

Figure 5:
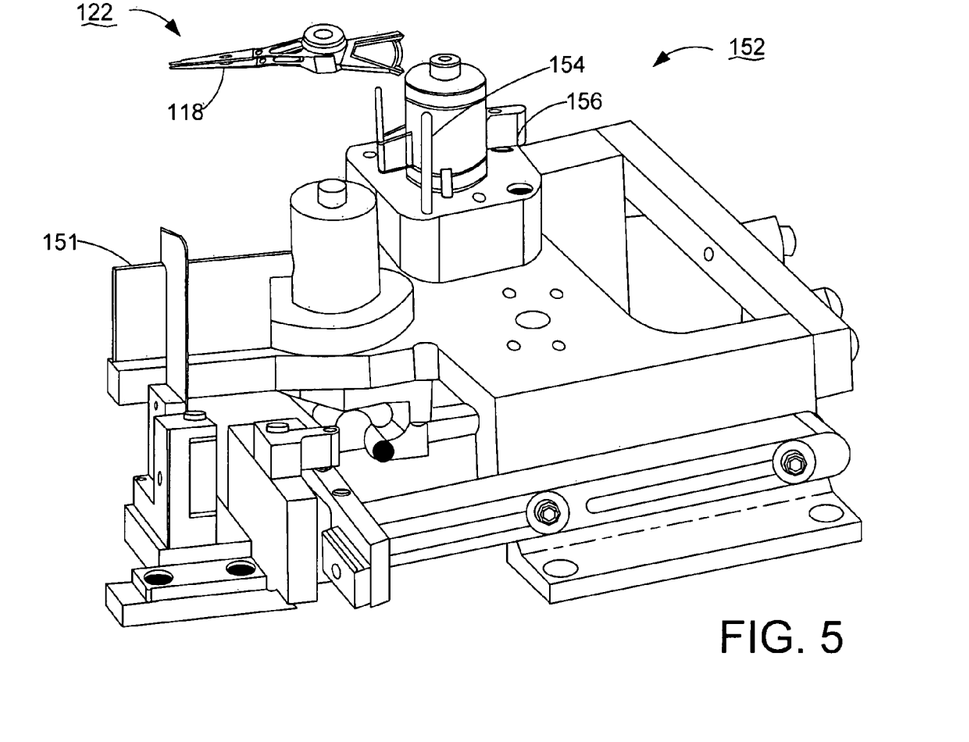
FIG. 5 is an isometric view of a portion of the measurement apparatus of FIG. 4, more clearly showing the reference object.

In the embodiments of FIG. 4 the locating fixture 152 grippingly engages the rotatable spindle of the bearing 114 so that the HSA 122 is freely rotatable in the x-y plane. FIG. 5 is an isometric view depicting the HSA 122 being lowered to a fixtured position. A clocking pin 154 is provided to abuttingly engage the HSA 122 where the suspensions 118 are longitudinally aligned with a reference object 151. A clocking member 156 is provided with a thumb lever for the operator or automated process to press against in a counterclockwise direction, thereby pressingly locating the HSA 122 against the clocking pin 154 in rotation about the x-y plane.

Remaining with FIGS. 4 and 5, the apparatus 150 has a stage 164 providing a three-axis motorized slide for positioning an end camera 160 in a selected x-y plane and a z-axis elevation in relation to the stationary fixture 152. The end camera 160 and a probe 162 are mounted on the stage 164. Presenting the distal end of the HSA 122 to the end camera 160 permits verifying that the heads 120 are longitudinally aligned with respect to each other within a predetermined manufacturing tolerance, as well as verifying that the heads 120 collectively are longitudinally aligned with the reference object 151 within a predetermined testing tolerance.

While the present description is directed toward embodiments wherein the fixture 152 remains stationary while the stage 164 moves the probe 162, the appended claims are not so limited. In alternative equivalent embodiments, for example, the probe 162 can remain stationary and the fixture 152 can be moved in the x-y-z space.

In these embodiments the probe 162 has a downface autocollimator 168 in tandem with a downface z position camera 172 working in conjunction with a downface laser 170. Likewise, the probe 162 has an upface autocollimator 174 in tandem with an upface z position camera 178 working in conjunction with an upface laser 176.

Figure 6:
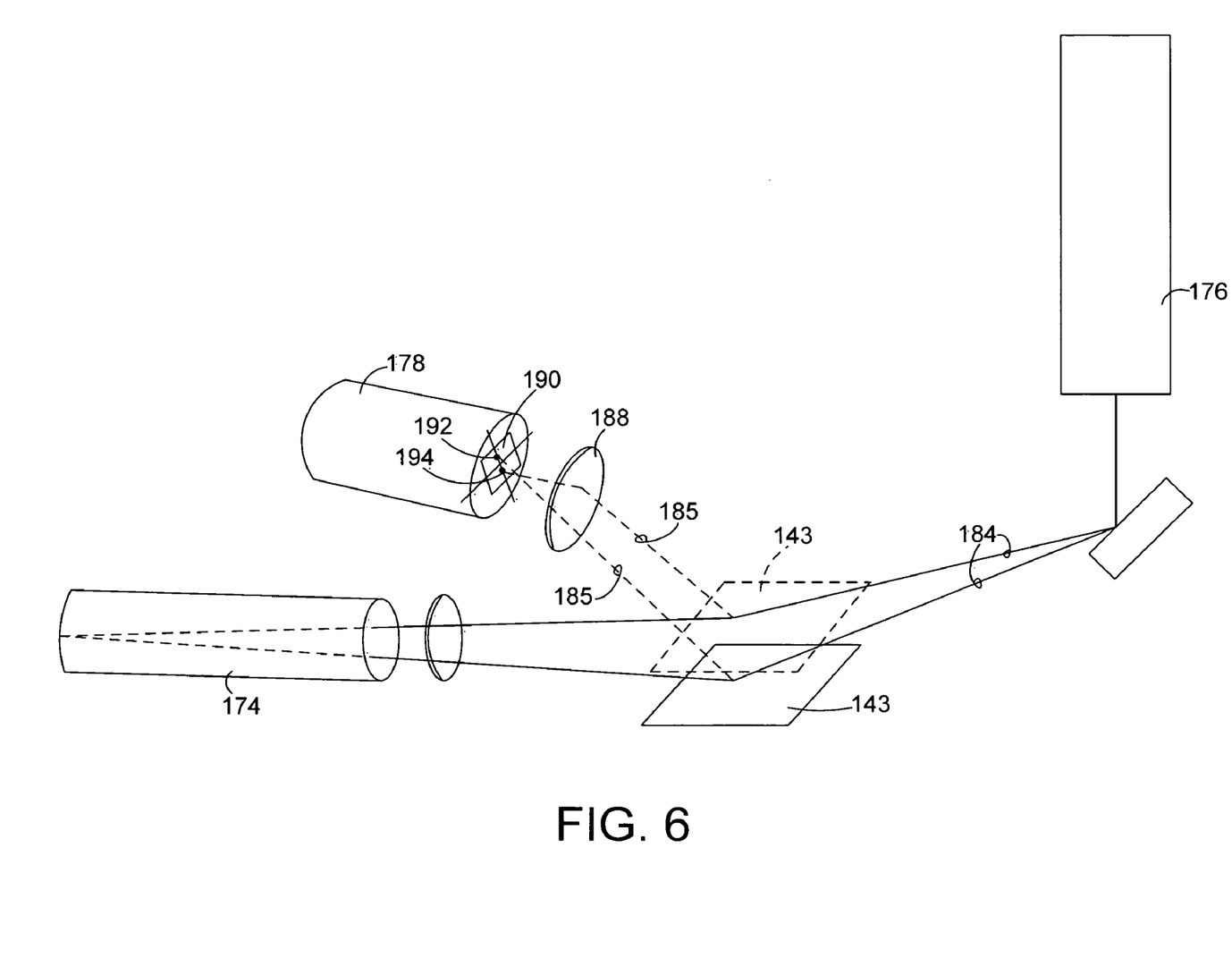
FIG. 6 is a diagrammatical depiction of the upfacing surface measurement portion of the measurement apparatus of FIG. 4.

FIG. 6 is a diagrammatic depiction of the upface portion of the probe 162. A light beam 184 from the upface laser 176 is reflected by a test surface, such as the slider 143, to the upface autocollimator 174. A mask may be used to provide a desired size and shape of the light beam 184. During reduction to practice of the present embodiments polarization filters were used to produce a high intensity light beam 184 with a diameter of about two microns. Deviation of the slider 143 surface from a plane that is normal to the z-axis causes the reflected light beam 184 to be laterally displaced on a focusing lens of the autocollimator 174. The lateral displacement is proportional to the planar disposition of the slider 143, and can therefore be used to calculate the pitch and roll static attitude of the slider 143.

The upface z position camera 178 has an imaging lens 188 that directs specular light 185 from the reflected light beam 184 to a charge coupled device (CCD) 190. The CCD 190 can be a semiconductor device with an array of light sensing elements in a known geometric arrangement. For instance, the position of the slider 143 depicted by solid lines is sensed by the CCD 190 at point 192. The displaced position of the slider 143 depicted by the broken lines is sensed by the CCD 190 at point 194.

As shown in FIGS. 7-10, the upfacing autocollimator 174 is preliminarily used to measure the z-axis position associated with the light beam 184 impinging a longitudinal axis of the reference object 151, denoted as a reference datum 180. In effect, the z position camera 178 can advantageously be used to mathematically zero the z-axis at the reference datum 180. The reference datum 180 can further be advantageously made to coincide with a locating feature, such as the mounting surface for the spindle bearing 114 of the HSA 122. By practicing these steps the apparatus 150 is effectively calibrated for measuring z-axis positions of selected portions of the test object in relation to the reference object 151, as discussed below. It will be noted that once this calibration procedure is performed, then multiple test objects can be measured reliably without re-performing the calibration procedure.

Figure 7:
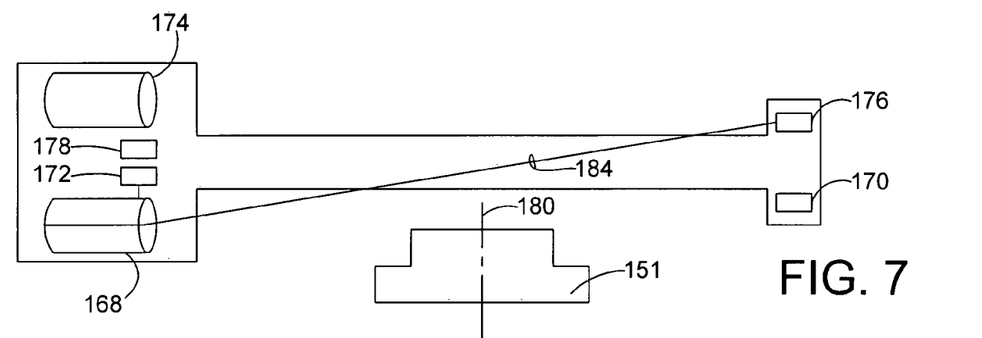
FIGS. 7-10 depict a method for zeroing the upfacing surface portion of the measurement apparatus of FIG. 4 to a z-axis reference datum in accordance with embodiments of the present invention.

FIG. 7 diagrammatically depicts the stage 164 (FIG. 4) moved generally into a position for beginning a procedure for zeroing the z-axis direction at the reference datum 180. Because the reference object 151 is operably aligned with the sliders 143, it is noted that the reference datum 180 is coextensive with a plane that includes a longitudinal axis of each slider 143, as shown and discussed below in FIGS. 13-20.

In the position of the stage 164 in FIG. 7, the light beam 184 from the upface laser 176 is unobstructed from its lateral position on one side of the reference object 151 to the downface autocollimator 168 which is disposed laterally on the opposing side of the reference object 151. Accordingly, the upfacing z position camera 178 does not detect any specular light because the light beam 184 is not reflected by the reference object 151.

Figure 8:
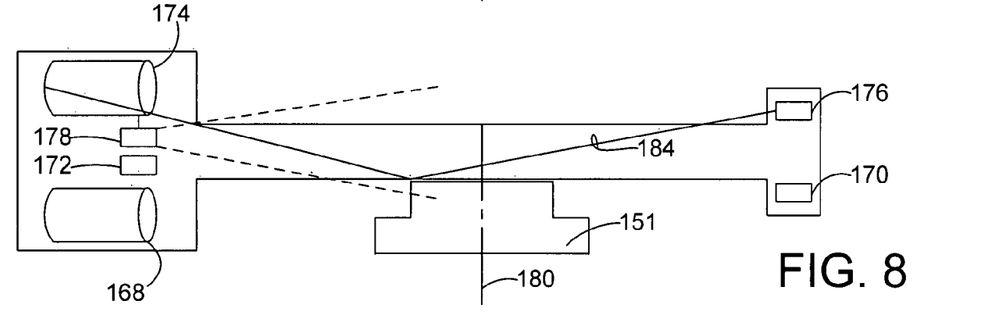

In FIG. 8 the stage 164 (FIG. 4) has been moved upward to a position where the light beam 184 first reflects off the reference object 151 to the upface autocollimator 174. The upface z position camera 178 first detects the specular light 185 from this reflection, and associates the corresponding z-axis location with one edge of the reference object 151.

Figure 9:
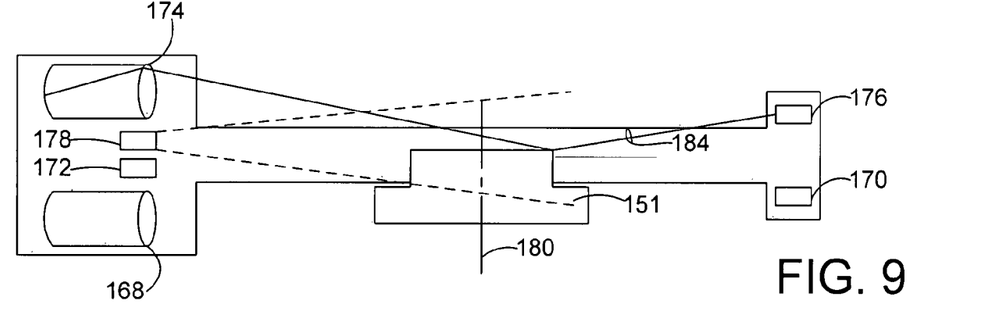
Figure 10:
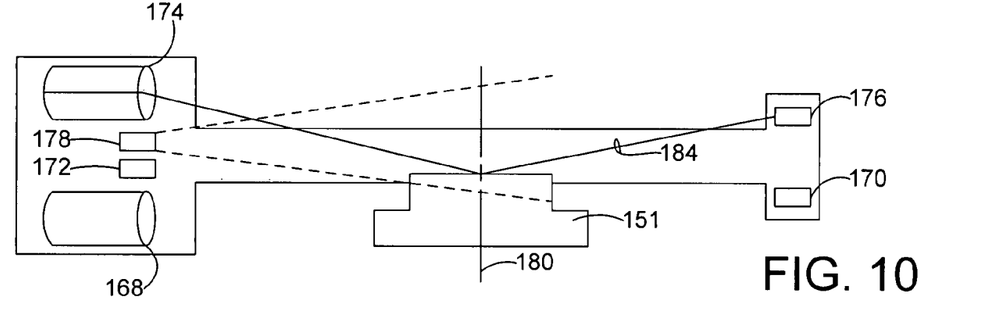

In some embodiments the z-axis position associated with the light beam 184 impinging the reference datum 180 is determined by next detecting the other edge of the reference object 151. In FIG. 9 the stage 164 (FIG. 4) has been moved farther upward to train the light beam 184 laterally across the reference object 151 surface. The upface z position camera 178 detects the movement of the light beam 184 in relation to displacement of the specular light 185. In FIG. 9 the stage 164 (FIG. 4) has been moved farther upward to the position where the light beam 184 is being reflected from the other edge of the reference object 151. That is, any further upward movement of the stage 164 will reflect the light beam 184 away from the upface autocollimator 174. The z-axis position associated with the reference datum 180 in these embodiments can thus be calculated as the half interval between the span of z-axis positions associated with both edges of the reference object 151, as shown in FIG. 10.

Figure 11:
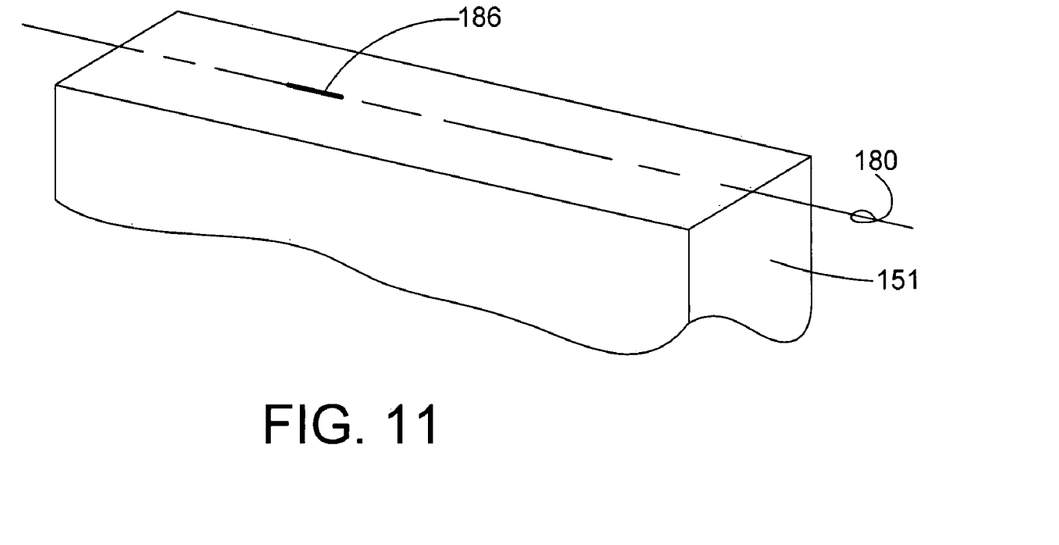
FIGS. 11 and 12 depict indicia demarcating the reference datum.
Figure 12:
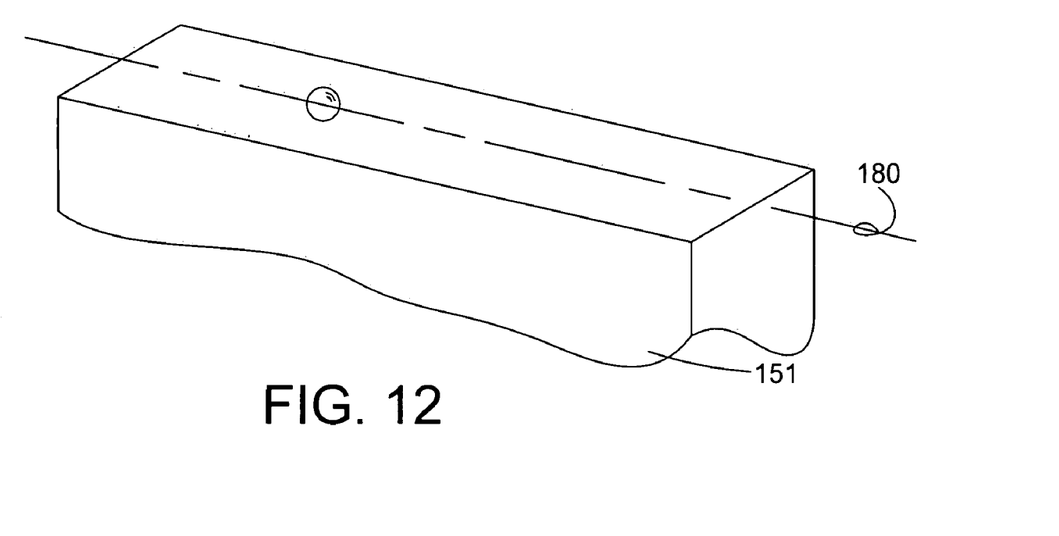

In alternative equivalent embodiments a predefined indicia can demarcate the reference datum 180. FIG. 11, for example, illustrates embodiments wherein a scribed line 186 is disposed on the longitudinal axis of the reference object 151 defining the reference datum 180. The upface z position camera 178 will detect when the light beam 184 impinges the scribed line 186 from changes in the specular light 185. FIG. 12 shows alternative equivalent embodiments wherein a precision spherical member, such as a ball bearing, is disposed on the longitudinal axis of the reference object 151. The upface z position camera 178 will detect when the light beam 184 tangentially impinges on the arcuate surface by the associated change in direction of the reflected specular light beam 185 on either side of the tangential point.

Figure 13:
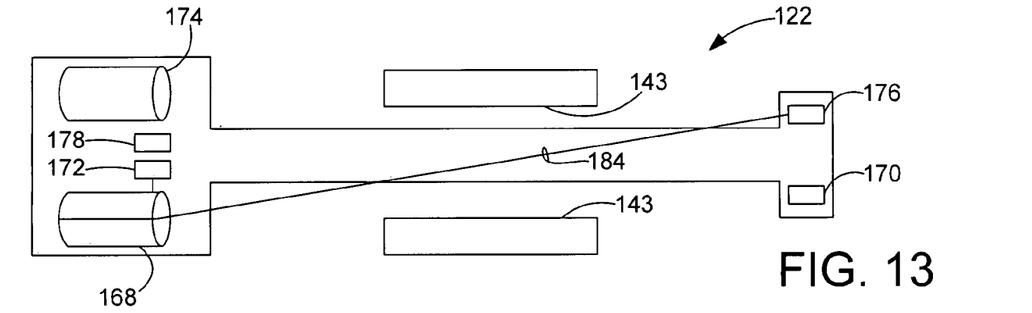
FIGS. 13-16 depict a method for measuring the planar disposition of the upfacing test surface with the measurement apparatus of FIG. 4 in accordance with embodiments of the present invention.

With the z-axis zero datum defined, a similar method is used to measure the z-axis position associated with the light beam 184 impinging on the longitudinal axis of each slider 143. Returning to the illustrative embodiments wherein the test object is the HSA 122, FIG. 13 shows the HSA 122 as it is mounted in the fixture 152 and the stage 164 (FIG. 4) positioned such that the light beam 184 from the upface laser 176 passes unobstructed through the gap between the distally supported and opposingly disposed sliders 143. Although a portion of the opposing sliders 143 is illustrated as being the test object in the described embodiments, other portions of the suspension 118 can be tested as well in equivalent alternative embodiments by utilizing the x-axis control of the motorized slide 158 (FIG. 4) to impinge the light beam 184 on the desired test surface. Measuring the slider 143 is preferable because it measures the air bearing surface that directly engages the fluid stream created by the rotating disc 108, and is thereby a good predictor of the resulting operable fly height.

Figure 14:
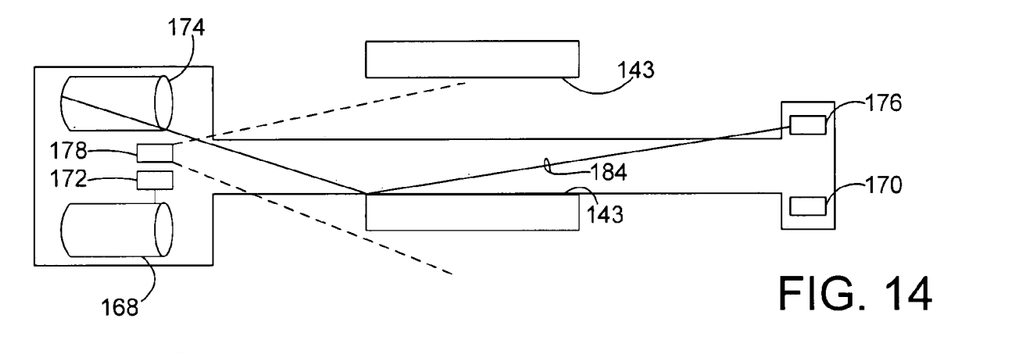
Figure 15:
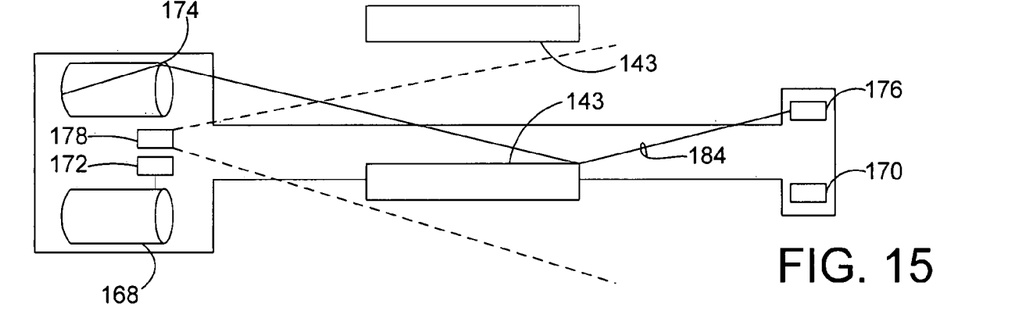
Figure 16:
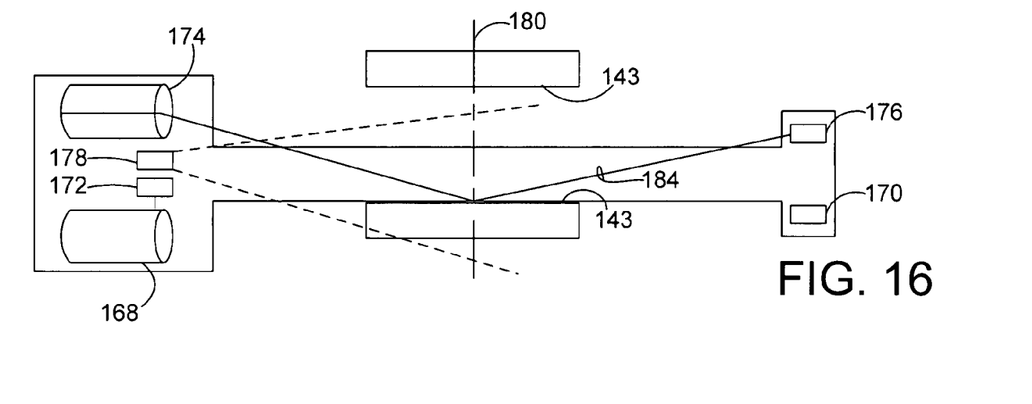

FIGS. 14-16 diagrammatically depict varying the z-axis position to train the light beam 184 from the upface laser 176 across the upfacing slider 143, in a manner similar to that of the reference object 151 described before. In FIG. 14 a first edge is detected, and in FIG. 15 the slider 143 has been moved upwardly until the second edge is detected. FIG. 16 shows the z-axis position associated with the longitudinal axis of the upfacing slider 143, being calculated as the half interval between the span of the z-axis positions at which the edges were detected. The z-axis position of the upfacing slider 143 is then calculated as the difference between the z-axis position at the longitudinal axis, shown in FIG. 16, and the z-axis position associated with the reference datum 180 (FIG. 10). The pitch and roll static attitude can be measured at any of the z-axis positions where the light beam 184 reflects off the slider 143 to the upfacing autocollimator 174.

Figure 17:
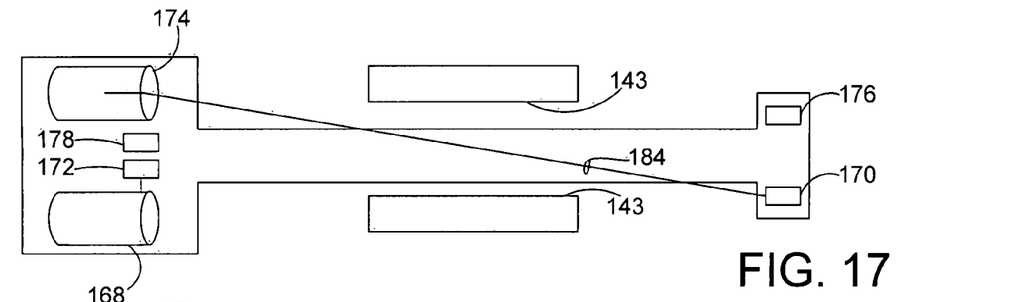
FIGS. 17-20 depict a method for measuring the planar disposition of the downfacing test surface with the measurement apparatus of FIG. 4 in accordance with embodiments of the present invention.
Figure 18:
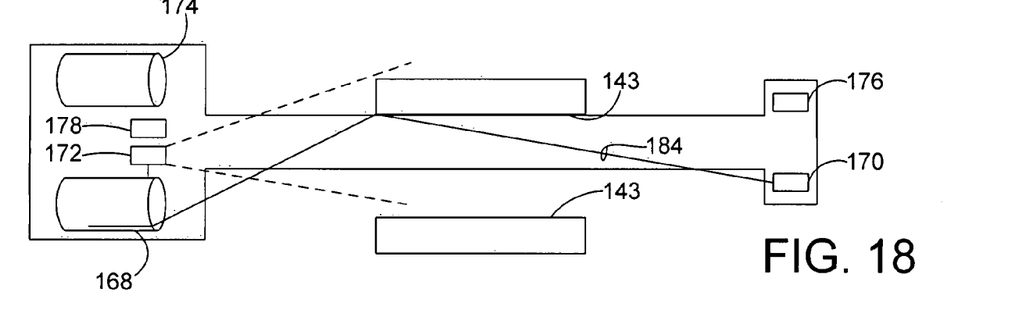
Figure 19:
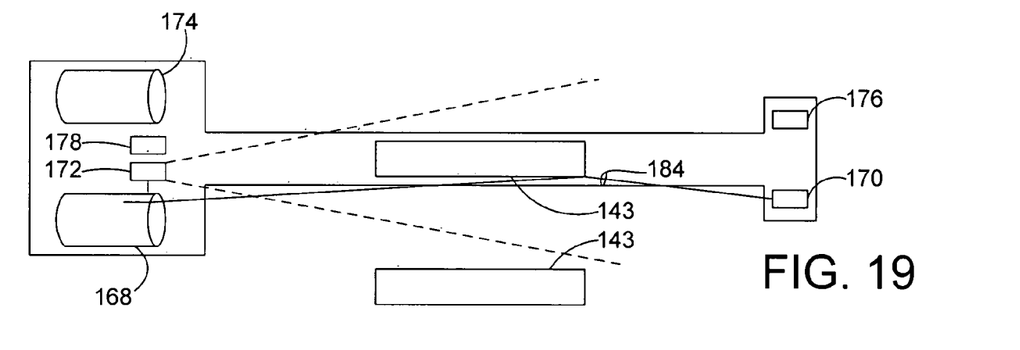
Figure 20:
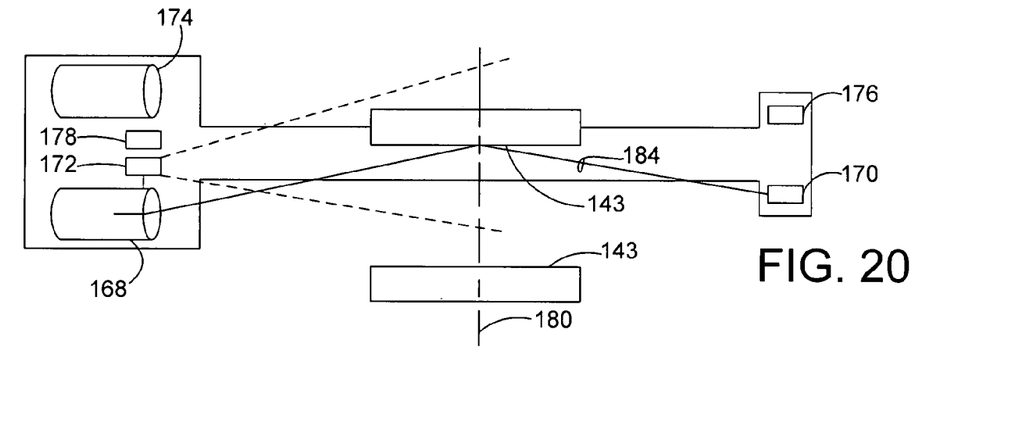

FIGS. 17-20 diagrammatically depict varying the z-axis position to train the light beam 184 from the downface laser 170 across the downfacing slider 143, in a manner similar to that described above. In FIG. 17 the light beam 184 passes unobstructed through the gap between the opposingly facing sliders 143. The downface z position camera 172 detects no specular light 185 because the light beam 184 is not reflected. In FIG. 18 a first edge of the slider 143 is detected, and in FIG. 19 the slider 143 has been moved downwardly until its second edge is detected. FIG. 20 shows the z-axis position associated with the longitudinal axis of the downfacing slider 143, being calculated as the half interval between the span of the z-axis positions at which the edges were detected.

The z-axis position of the downfacing slider 143 is then calculated as the difference between the z-axis position at the longitudinal axis, shown in FIG. 20, and the z-axis position associated with the reference datum 180 (FIG. 10). The pitch and roll static attitude can be measured at any of the z-axis positions where the light beam 184 reflects off the reference object 151 to the downfacing autocollimator 168.

It is now restated to emphasize that the present embodiments contemplate measuring the axial position of both the upfacing and the downfacing sliders 143 in relation to the reference datum 180 by encroaching the gap between the sliders 143 with a measurement device without altering the longitudinal alignment of the sliders 143. This advantageously permits measuring the static position of the sliders 143 as they exist in a subassembly component destined for final assembly. Measuring the sliders 143 before they are assembled into the HSA 122 level component, or altering the longitudinal alignment for measurement, as previous attempted solutions do, otherwise introduces process variation that is not a factor in the present embodiments.

Figure 21:
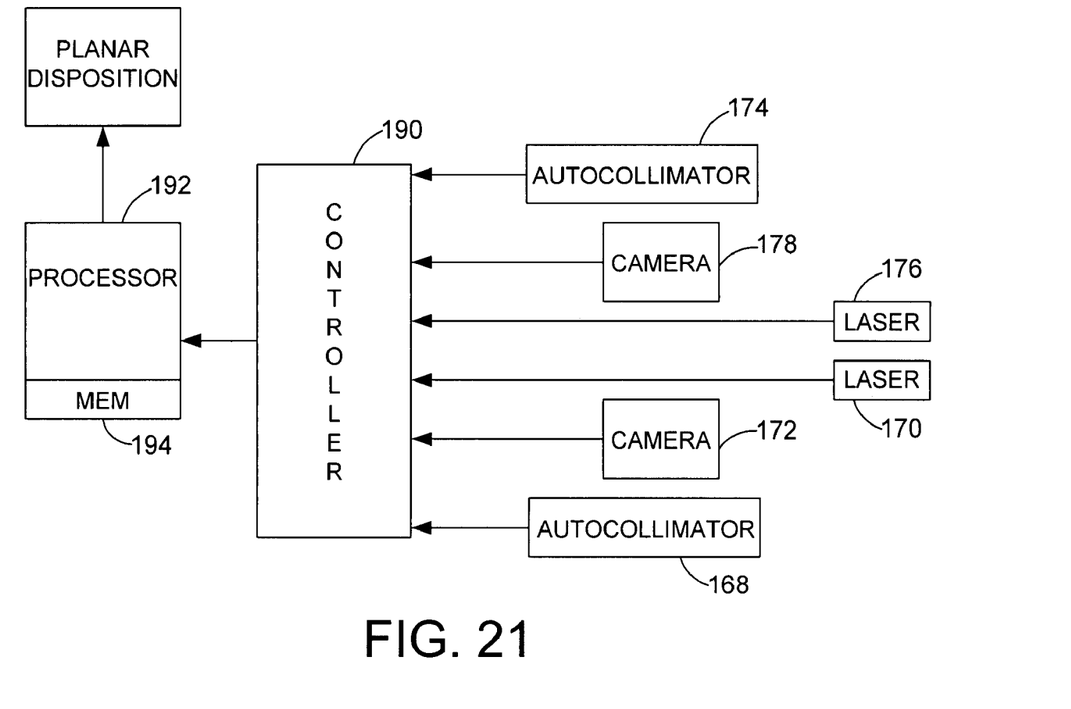
FIG. 21 is a functional block diagram of a control system for the measurement apparatus of FIG. 4 in accordance with embodiments of the present invention.

FIG. 21 is a schematic representation of a control system of the measurement apparatus 150 in accordance with embodiments of the present invention. A controller 190 receives positional information from the z position cameras 172, 178 and static attitude information from the autocollimators 168, 174. The controller 190 also receives information as to which laser 170, 176 is energized and is thereby associated with the positional information. The controller 190 provides the positional information to a processor 192 which is responsive to programming instructions stored in memory 194 in determining the planar disposition of the test surface.

Some present embodiments described herein generally contemplate a data storage device having a plurality of transducers operably disposed in a data transfer relationship with one or more storage mediums, and means for measuring a planar disposition of each of the distally disposed transducers while existing in a head stack assembly without altering a longitudinal alignment of the transducers and without removing the head stack assembly from the fixture between transducer measurements.

For purposes of this description and meaning of the appended claims, the term "means for measuring" expressly contemplates the structure described and structural equivalents thereof that permit measuring the planar aspects of selected surfaces of the test object, such as in measuring the slider 143 after it has been assembled into the HSA 122 level subassembly component in the illustrative embodiments described herein.

In equivalent alternative structures to the embodiments discussed herein, rather than employing two sets of lasers, cameras, and autocollimators, one set can be employed that is collectively rotated when changing from measuring an upface surface to measuring a downface surface. Also, as previously discussed, in equivalent alternative structures the lasers, cameras, and autocollimators can remain stationary while the fixture moves in the x-y-z space.

The term "means for measuring" expressly does not contemplate other attempted solutions that measure similar planar aspects of the slider 143, but do so either before it has been assembled into the HSA 122 level subassembly component, or do so by altering the longitudinal alignment of the suspensions 118.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to measuring components of a moving media data storage device, it will be appreciated by those skilled in the art that the claimed subject matter is not so limited and various other systems can utilize the present embodiments without departing from the spirit and scope of the claimed invention.

What is claimed is:

1. A method comprising:
   supporting a test object having a pair of opposing test surfaces that are longitudinally aligned by cantilever portions of the test object to spatially separate the test surfaces forming a gap therebetween;
   zeroing to a reference datum along an axial direction coextensive with a plane that includes a longitudinal axis of each test surface by sending a light beam from a source laterally disposed on one side of the gap and receiving the light beam by a probe on an opposing side of the gap; and
   determining both an axial spacing in relation to the reference datum and a static attitude of each test surface by encroaching the gap with a measurement device without altering the longitudinal alignment of the test surfaces.

2. The method of claim 1 wherein the zeroing step comprises detecting an axial position associated with a reference object that is longitudinally aligned with the test surfaces.

3. The method of claim 2 wherein the zeroing step comprises detecting an axial position associated with a reference surface longitudinal axis on the reference object.

4. The method of claim 3 wherein the zeroing step comprises reflecting the light beam from the reference surface to the probe, whereby the axial position of the light source and the probe is varied to train the light beam laterally across the reference surface to detect both edges of the reference surface, and wherein the reference surface longitudinal axis is defined as a half-interval of an axial span associated with the edges.

5. The method of claim 3 wherein the zeroing step comprises reflecting the light beam from the reference surface to the probe, whereby the axial position of the light source and the probe is varied to train the light beam laterally across the reference surface to detect a predefined indicia on the reference surface.

6. The method of claim 5 wherein the indicia is characterized by an arcuate surface with a curvature radius laying coextensively with the reference surface longitudinal axis.

7. The method of claim 3 wherein the determining step comprises sending a light beam from the source and receiving the light beam by the probe in determining the axial spacing of each test surface.

8. The method of claim 7 wherein the opposing test surfaces are characterized by a first face opposing a second face defining the gap therebetween, and wherein the determining step comprises sending a light beam from the source in a first direction toward the first face in determining the axial position of the first face and sending a light beam from the source in a different second direction toward the second face in determining the axial position of the second face.

9. The method of claim 8 wherein the determining step comprises receiving a light beam reflected through the gap from the first face in a third direction by the probe in determining the axial position of the first face and receiving a light beam reflected through the gap from the second face in a different fourth direction by the probe in determining the axial position of the second face.

10. The method of claim 9 wherein the source is characterized by a first face source aimed at the first face and a second face source aimed at the second face, wherein the probe is characterized by a first face probe aimed at the first face and a second face probe aimed at the second face, and wherein the determining step comprises receiving by the first face probe a light beam that is unobstructed through the gap from the second face source and receiving by the second face probe a light beam that is unobstructed through the gap from the first face source.

11. The method of claim 9 wherein the determining step comprises reflecting a laser beam to an autocollimator arrangement in determining the static attitude of the first face and the second face.

12. The method of claim 11 wherein the determining step is characterized by an autocollimator arrangement having a first autocollimator aimed at the first face and a second autocollimator aimed at the second face, and wherein the pitch and roll static attitude of the first face and the second face is determined by the first and second autocollimators, respectively.

13. The method of claim 11 wherein the determining step is characterized by reflecting specular light from the laser beam to a camera arrangement in determining the axial position of the first face and the second face.

14. The method of claim 13 wherein the determining step is characterized by the camera arrangement having a first camera aimed at the first face and a second camera aimed at the second face, and wherein the axial position of the first face and the second face is determined by the first and second cameras.

15. The method of claim 14 wherein the determining step is characterized by a charge coupled device used as the probe.

16. The method of claim 13 utilized in measuring the axial spacing and a pitch and roll static attitude of each of a plurality of sliders in a head stack assembly level component.

17. A head stack assembly tester comprising:
   a fixture configured to supportingly engage a proximal end of a head stack assembly in a manner unencumbering a cantilevered support the head stack assembly provides to one or more distally disposed pairs of opposing heads, each pair of opposing heads being spatially separated defining a gap therebetween;

a light source operably disposed on one side of the head stack assembly;

a light-sensing probe operably disposed on the opposing side of the head stack assembly; and a stage providing a selectively moveable relationship between the heads and each of the light source and the probe to direct a light beam from the light source into the gap and to direct the light beam from the gap to the probe.

18. The head stack assembly tester of claim 17 wherein the fixture supports the head stack assembly in relation to a longitudinal plane, and wherein the stage operably moves the light source and the probe in an axial direction that is orthogonal to the longitudinal plane to direct the light beam from the light source to impinge respective features of the opposing pair of heads.

19. The head stack assembly tester of claim 18 comprising a reference object longitudinally aligned with the heads and defining a reference datum in the axial direction.

20. The head stack assembly tester of claim 19 comprising an indicia on the reference object defining the reference datum.

21. The head stack assembly tester of claim 20 wherein the indicia comprises an arcuate surface with a curvature radius laying coextensively with the reference object longitudinal axis.

22. The head stack assembly tester of claim 21 wherein the light source operably aims the light beam into the gap in a first direction to impinge a first feature of the opposing pair of heads, and operably aims the light beam into the gap in a second direction to impinge a second feature of the opposing pair of heads.

23. The head stack assembly tester of claim 22 wherein the probe operably receives the light beam in a third direction reflected through the gap from the first feature of the opposing pair of heads, and operably receives the light beam in a fourth direction reflected through the gap from the second feature of the opposing pair of heads.

24. The head stack assembly tester of claim 23 wherein the light source comprises a first laser aimed toward the first feature and a second laser aimed toward the second feature.

25. The head stack assembly tester of claim 24 wherein the probe comprises an autocollimator arrangement.

26. The head stack assembly of claim 25 wherein the autocollimator arrangement comprises a first autocollimator aimed at the first feature and a second autocollimator aim at the second feature.

27. The head stack assembly tester of claim 26 wherein the probe comprises a camera arrangement.

28. The head stack assembly tester of claim 27 wherein the camera arrangement comprises a first camera aimed toward the first feature and a second camera aimed toward the second feature.

29. The head stack assembly tester of claim 28 wherein the cameras comprise charge coupled devices.

30. The head stack assembly tester of claim 29 wherein the first and second lasers and the first and second cameras are arranged so that the first camera detects specular light from the light beam from the first laser that is reflected by the first feature in the gap, and the second camera detects specular light from the light beam from the second laser that is reflected by the second feature in the gap.

31. The head stack assembly tester of claim 30 wherein the first and second lasers and the first and second autocollimators are arranged so that the first autocollimator detects the light beam from the second laser that is unobstructed through the gap, and the second autocollimator detects the light beam from the first laser that is unobstructed through the gap.

32. The head stack assembly of claim 31 comprising a processor executing programming instructions stored in memory that utilizes position information from the cameras to calculate axial positions associated with the features.

33. The head stack assembly of claim 31 comprising a processor executing programming instructions stored in memory that utilizes autocollimator information in calculating a pitch and roll static attitude of the features.

* * * * *